(12) United States Patent
Ihm et al.

(10) Patent No.: US 8,494,067 B2
(45) Date of Patent: Jul. 23, 2013

(54) PILOT TRANSMISSION METHOD IN A WIRELESS COMMUNICATION SYSTEM

(75) Inventors: Bin Chul Ihm, Anyang-si (KR); Hyun Soo Ko, Anyang-si (KR); Moon Il Lee, Anyang-si (KR); Jin Young Chun, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 238 days.

(21) Appl. No.: 13/062,623

(22) PCT Filed: Aug. 26, 2009

(86) PCT No.: PCT/KR2009/004752
§ 371 (c)(1),
(2), (4) Date: Mar. 7, 2011

(87) PCT Pub. No.: WO2010/027153
PCT Pub. Date: Mar. 11, 2010

(65) Prior Publication Data
US 2011/0158345 A1 Jun. 30, 2011

Related U.S. Application Data

(60) Provisional application No. 61/095,296, filed on Sep. 8, 2008.

(30) Foreign Application Priority Data

Aug. 19, 2009 (KR) .................. 10-2009-0076663

(51) Int. Cl.
*H04K 1/10* (2006.01)

(52) U.S. Cl.
USPC ........... 375/260; 375/267; 375/295; 375/299; 375/316; 375/340; 375/347; 455/101; 455/132; 455/500; 455/562.1; 370/334; 370/464; 370/480; 341/173; 341/180

(58) Field of Classification Search
USPC ............... 375/260, 267, 295, 299, 316, 340, 375/347; 455/101, 132, 500, 562.1; 370/334, 370/464, 480; 341/173, 180
See application file for complete search history.

(56) References Cited

U.S. PATENT DOCUMENTS

| 2007/0293233 A1 | 12/2007 | Inoue et al. |
| 2008/0170633 A1 | 7/2008 | Karino |
| 2009/0046569 A1* | 2/2009 | Chen et al. .................... 370/203 |

FOREIGN PATENT DOCUMENTS

| WO | WO 2008/041674 A | 4/2008 |

* cited by examiner

*Primary Examiner* — Leon Flores
(74) *Attorney, Agent, or Firm* — McKenna, Long & Aldridge, LLP.

(57) ABSTRACT

A pilot transmission method in a wireless communication system is provided. The method includes: transmitting a first pilot for channel measurement through a first transmission section; and transmitting a second pilot for channel measurement through a second transmission section which is subsequent in time to the first transmission section, wherein the first transmission section and the second transmission section include a plurality of sub-bands, parts of the plurality of sub-bands use predetermined precoding whereas the remaining sub-bands use non-predetermined precoding, and any one of the first pilot and the second pilot is carried only on a sub-band which uses the predetermined precoding whereas the other pilot is carried on the entirety of the plurality of sub-bands.

14 Claims, 7 Drawing Sheets

PILOT TRANSMISSION METHOD IN A WIRELESS COMMUNICATION SYSTEM

This application is a 35 U.S.C. §371 National Stage entry of International Application No. PCT/KR2009/004752, filed on Aug. 26, 2009, and claims priority to U.S. Provisional Application No. 61/095,296, filed Sep. 8, 2008 and Korean Application No. 10-2009-0076663, filed on Aug. 19, 2009 each of which is hereby incorporated by reference in its entirety as if fully set forth herein.

TECHNICAL FIELD

The present invention relates to wireless communications, and more particularly, to a pilot transmission method.

BACKGROUND ART

A wireless communication system is widely used to provide various types of communication. For example, voice and/or data are provided by the wireless communication system. A typical wireless communication system provides one or more shared resources to multiple users. For example, the wireless communication system may use various multiple access schemes, such as code division multiple access (CDMA), time division multiple access (TDMA), and frequency division multiple access (FDMA).

Orthogonal frequency division multiplexing (OFDM) uses a plurality of orthogonal subcarriers. Further, the OFDM uses an orthogonal property between inverse fast Fourier transform (IFFT) and fast Fourier transform (FFT). A transmitter transmits data by performing IFFT on data. A receiver restores original data by performing FFT on a received signal. The transmitter uses IFFT to combine the plurality of subcarriers, and the receiver uses FFT to split the plurality of sub-carriers. According to the OFDM, complexity of the receiver can be decreased in a frequency selective fading environment of a broadband channel, and spectral efficiency can be increased by using selective scheduling in a frequency domain by utilizing a different channel feature between subcarriers. Orthogonal frequency division multiple access (OFDMA) is a multiple access method based on the OFDM. According to the OFDMA, different subcarriers are allocated to multiple users, and thus efficiency of radio resources can be increased.

For the purpose of data transmission/reception, system synchronization acquisition, channel information feedback, etc., there is a need to estimate an uplink channel or a downlink channel in the wireless communication system. Channel estimation is a process of recovering a transmission signal by compensating for signal distortion in an environment where a rapid change occurs due to fading. In general, channel estimation requires a reference signal or a pilot known to both the transmitter and the receiver. In a multiple antenna system that increases data transmission efficiency by using a plurality of antennas, each antenna experiences a different channel, and thus a pilot arrangement structure is designed by considering each antenna. Channel estimation can become more accurate when more pilots are arranged in a limited radio resource. However, as more pilots are arranged, the radio resources capable of transmitting data is decreased. Therefore, a data throughput of the wireless communication system is decreased.

Accordingly, there is a need for a pilot transmission method capable of decreasing an overhead caused by a pilot and increasing a throughput of a wireless communication system.

SUMMARY OF INVENTION

Technical Problem

The present invention provides a method of effectively transmitting a pilot.

Technical Solution

According to an aspect of the present invention, a pilot transmission method in a wireless communication system is provided. The method includes: transmitting a first pilot for channel measurement through a first transmission section; and transmitting a second pilot for channel measurement through a second transmission section which is subsequent in time to the first transmission section, wherein the first transmission section and the second transmission section include a plurality of sub-bands, parts of the plurality of sub-bands use predetermined precoding whereas the remaining sub-bands use non-predetermined precoding, and any one of the first pilot and the second pilot is carried only on a sub-band which uses the predetermined precoding whereas the other pilot is carried on the entirety of the plurality of sub-bands.

According to another aspect of the present invention, a method of transmitting control information in a wireless communication system is provided. The method includes: receiving a pilot for measuring a channel allocated to a sub-band which uses precoding dynamically determined according to the determination of a base station or the request of a user equipment among a plurality of sub-bands including a plurality of subcarriers in a frequency domain; and transmitting channel information for the plurality of sub-band based on the pilot, wherein a sub-band other than a sub-band which uses precoding dynamically determined among the plurality of sub-bands uses predetermined precoding.

Advantageous Effects

According to the present invention, an overhead caused by a pilot can be reduced, and a data throughput of a wireless communication system can be increased.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16e (WiMAX), IEEE 802.20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in downlink and uses the SC-FDMA in uplink. IEEE 802.16m is an evolution of IEEE 802.16e.

Figure 1:
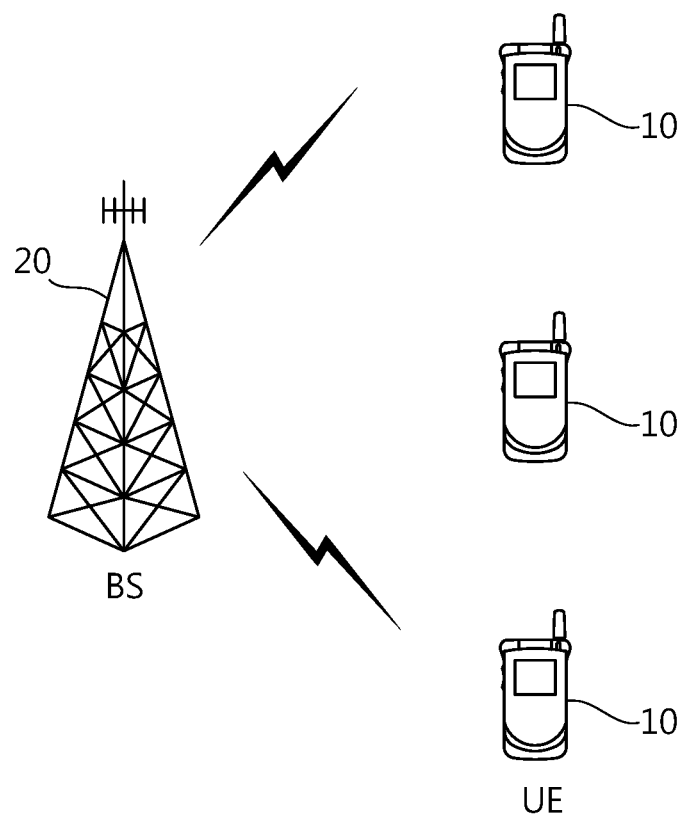
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes a user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There may be one or more cells within the coverage of the BS 20.

A downlink (DL) represents a communication link from the BS 20 to the UE 10, and an uplink (UL) represents a communication link from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
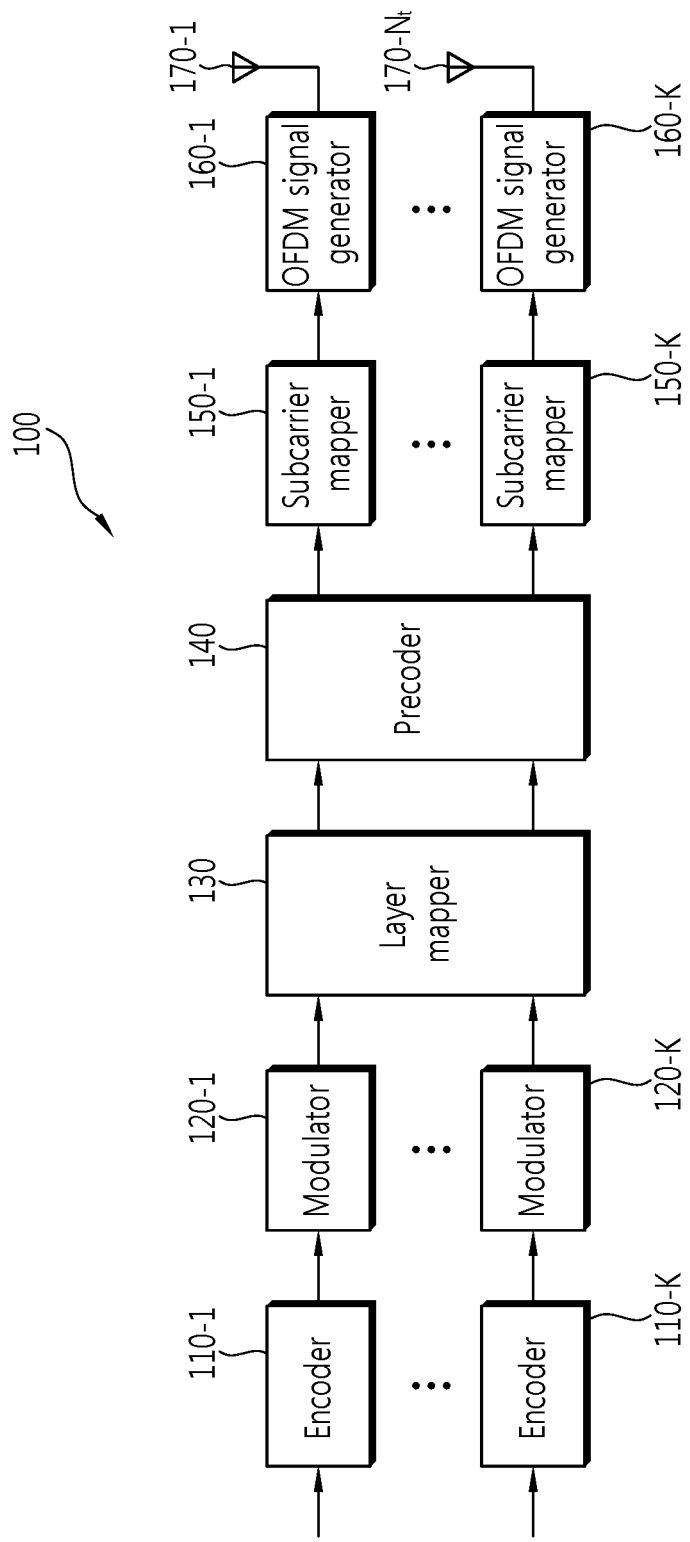
FIG. 2 is a block diagram showing a transmitter according to an embodiment of the present invention.

FIG. 2 is a block diagram showing a transmitter according to an embodiment of the present invention.

Referring to FIG. 2, a transmitter 100 includes encoders 110-1, . . . , 110-K, modulators 120-1, . . . , 120-K, a layer mapper 130, a precoder 140, subcarrier mappers 150-1, . . . , 150-K, and OFDM signal generators 160-1, . . . , 160-K. The transmitter 100 also includes Nt (Nt>1) transmit (Tx) antennas 170-1, . . . , 170-Nt.

The encoders 110-1, . . . , 110-K generate coded data by encoding input data according to a predetermined coding scheme. The modulators 120-1, . . . , 120-K arrange the coded data into symbols representing locations on a signal constellation. A modulation scheme is not limited to a specific modulation scheme, and may be an m-phase shift keying (m-PSK) or an m-quadrature amplitude modulation (m-QAM). Examples of the m-PSK include binary PSK (BPSK), quadrature PSK (QPSK), and 8-PSK. Examples of the m-QAM include 16-QAM, 64-QAM, and 256-QAM.

The layer mapper 130 defines a layer of an input symbol so that each antenna can distribute an antenna-specific symbol to a path of each antenna. The layer is defined as an information path input to the precoder 140. The information path located ahead of the precoder 140 can be called a virtual antenna (or layer).

The precoder 140 processes an input symbol by using a MIMO scheme according to the multiple Tx antennas 170-1, . . . , 170-Nt. For example, the precoder 140 can use codebook-based precoding. The precoder 140 distributes an antenna-specific symbol to the subcarrier mappers 150-1, . . . , 150-K for a path of a specific antenna. Each information path transmitted to one antenna by the precoder 140 by the use of one subcarrier mapper is called a stream. The antenna may be a physical antenna.

The subcarrier mappers 150-1, . . . , 150-K allocate input symbols to suitable subcarriers and then multiplex the resultant symbols according to a user. The OFDM signal generators 160-1, . . . , 160-K modulate input symbols according to an OFDM scheme and then outputs OFDM symbols. The OFDM signal generators 160-1, . . . , 160-K can perform IFFT on input symbols. A cyclic prefix (CP) may be inserted into a time-domain symbol which has undergone the IFFT. The OFDM symbols are transmitted through the respective Tx antennas 170-1, . . . , 170-Nt.

In the MIMO system, the transmitter 100 can operate in two modes. One is a single codeword (SCW) mode and the other is an multi codework (MCW) mode. In the SCW mode, Tx signals transmitted through a MIMO channel have the same data rate. In the MCW mode, data transmitted through the MIMO channel is independently encoded, and thus the Tx signals can have different data rates. The MCW mode operates when a rank is greater than or equal to 2.

Figure 3:
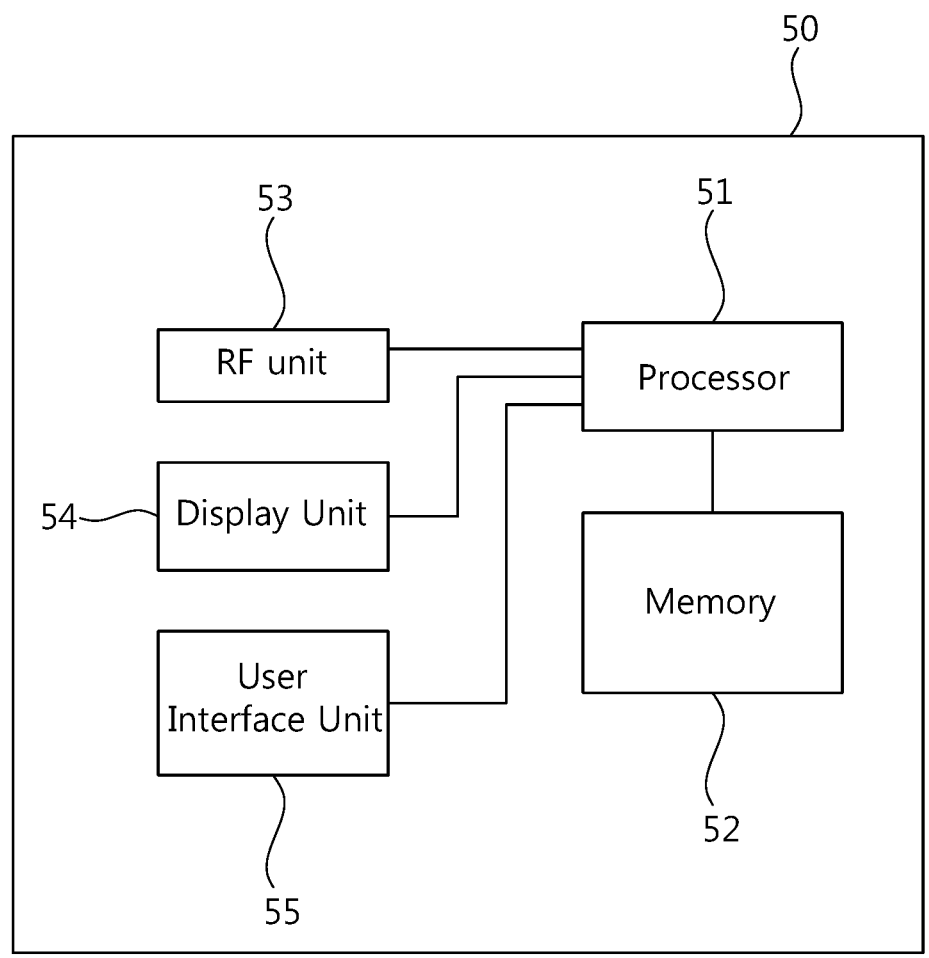
FIG. 3 is a block diagram showing constitutional elements of a user equipment.

FIG. 3 is a block diagram showing constitutional elements of a UE.

Referring to FIG. 3, a UE 50 includes a processor 51, a memory 52, a radio frequency (RF) unit 53, a display unit 54, and a user interface unit 55. Layers of the radio interface protocol are implemented in the processor 51. The processor 51 provides a control plane and a user plane. The function of each layer can be implemented in the processor 51. The processor 51 processes either a pilot or a reference signal to be described below.

The memory 52 is coupled to the processor 51 and stores operating systems, applications, and general files. The display unit 54 displays a variety of information of the UE and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Figure 4:
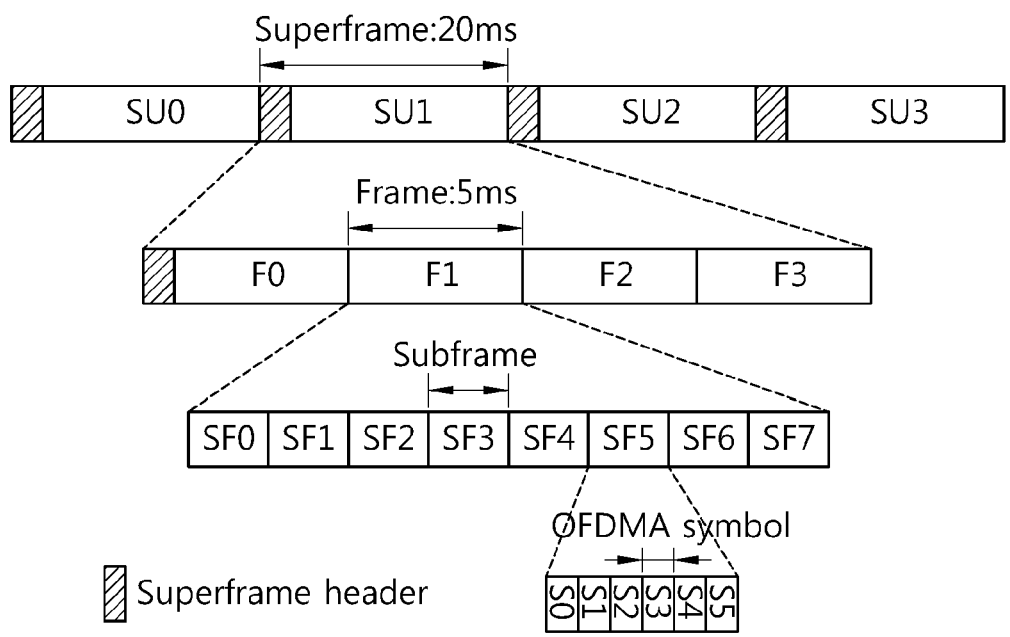
FIG. 4 shows an example of a frame structure.

FIG. 4 shows an example of a frame structure.

Referring to FIG. 4, a superframe SU includes a superframe header (SFH) and four radio frames F0, F1, F2, and F3. Although it is shown that each superframe has a size of 20 milliseconds (ms) and each frame has a size of 5 ms, the present invention is not limited thereto. The SFH may be located at a front-most position of the superframe. A common control channel is allocated to the SFH. The common control channel is used to transmit information regarding frames constituting the superframe or control information (e.g., system information) that can be commonly utilized by all UEs within a cell.

One frame includes a plurality of subframes SF0, SF1, SF2, SF3, SF4, SF5, SF6, and SF7. Each subframe can be used for UL or DL transmission. Each subframe may consist of 6 or 7 OFDMA symbols, but this is for exemplary purposes only. Time division duplexing (TDD) or frequency division duplexing (FDD) may be applied to the frame. In the TDD, each subframe is used in UL or DL transmission at the same frequency and at a different time. That is, subframes included in a TDD frame are divided into a UL subframe and a DL subframe in a time domain. In the FDD, each subframe is used in UL or DL transmission at the same time and at a different frequency. That is, subframes included in an FDD frame are divided into a UL subframe and a DL subframe in a frequency domain. UL transmission and DL transmission can be simultaneously performed while occupying different frequency bands.

A subframe includes at least one frequency partition. The frequency partition consists of at least one physical resource unit (PRU). The frequency partition may include a contiguous/localized PRU and/or a distributed/non-contiguous PRU. The frequency partition may be used for other purposes such as fractional frequency reuse (FFR) or multicast or broadcast service (MBS).

The PRU is defined as a basic physical unit for allocating resources including a plurality of physically contiguous OFDMA symbols and a plurality of physically contiguous subcarriers. The number of OFDMA symbols included in the PRU may be equal to the number of OFDMA symbols included in one subframe. For example, when one subframe consists of six OFDMA symbols, the PRU may be defined with 18 subcarriers and six OFDMA symbols. A logical resource unit (LRU) is a basic logical unit for distributed resource allocation and contiguous resource allocation. The LRU is defined with a plurality of OFDMA symbols and a plurality of subcarriers, and includes pilots used in the PRU. Therefore, one LRU includes a proper number of subcarriers, where the proper number depends on the number of allocated pilots.

A distributed resource unit (DRU) may be used to obtain a frequency diversity gain. The DRU includes a distributed subcarrier group in one frequency partition. The DRU has the same physical size as the PRU. In the DRU, one or more subcarriers may be a minimum unit of physically contiguous subcarriers constituting each of the distributed subcarrier groups.

A contiguous resource unit (CRU) may be used to obtain a frequency selective scheduling gain. The CRU includes a localized subcarrier group. The CRU has the same physical size as the PRU. The CRU and the DRU may be supported in the frequency domain by using a frequency division multiplexing (FDM) scheme.

Figure 5:
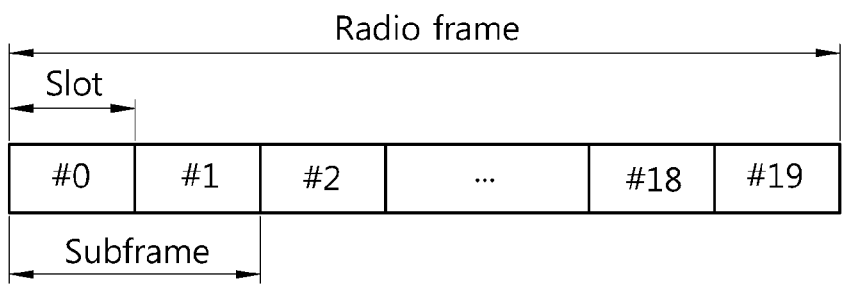
FIG. 5 shows another example of a frame structure.

FIG. 5 shows another example of a frame structure.

Referring to FIG. 5, a radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The subframe may be divided into two slots in a time domain. The slot is a unit of radio resource allocation in the time domain and a frequency domain. One slot may include a plurality of OFDM symbols in the time domain and at least one subcarrier in the frequency domain. For example, one slot can include 7 or 6 OFDM symbols. The subframe can include a plurality of resource blocks (RBs). The RB is a basic unit of radio resources allocated to the UE. The RB may include a plurality of subcarriers. For example, the RB may be a region consisting of 12 contiguous subcarriers in the frequency domain and two slots in the time domain. 10 subframes may constitute one radio frame.

The subframe divides a frequency band into 3 parts. Two parts at both ends of the frequency band are used as the control region, and a middle part of the frequency band is used as the data region. Since the control region and the data region use different frequency bands, frequency division multiplexing (FDM) is achieved. This is for exemplary purposes only, and thus the arrangement of the control region and the data region in the subframe is not limited thereto. In addition, the number of subframes included in the radio frame, the number of slots included in the subframe, and the number of OFDM symbols included in the slot may change variously.

The slot assigned to each UE can be frequency-hopped in the subframe. That is, one of two slots assigned to one UE can be assigned to one side of the frequency band, and the other slot can be assigned to the other side of the frequency band. A frequency diversity gain can be obtained by transmitting the control channel for one UE through the slots assigned to the different frequency bands. In addition, a plurality of users may be multiplexed by code division multiplexing (CDM).

The structure of the radio frame is for exemplary purposes only, and thus the number of subframes included in the radio frame or the number of slots included in the subframe may change variously.

Now, a method of transmitting a pilot on a sub-band basis will be described.

The sub-band includes at least one physical resource unit (PRU) or at least one physical resource block (PRB) in a frequency domain. That is, the sub-band may include a plurality of subcarriers in the frequency domain.

Figure 6:
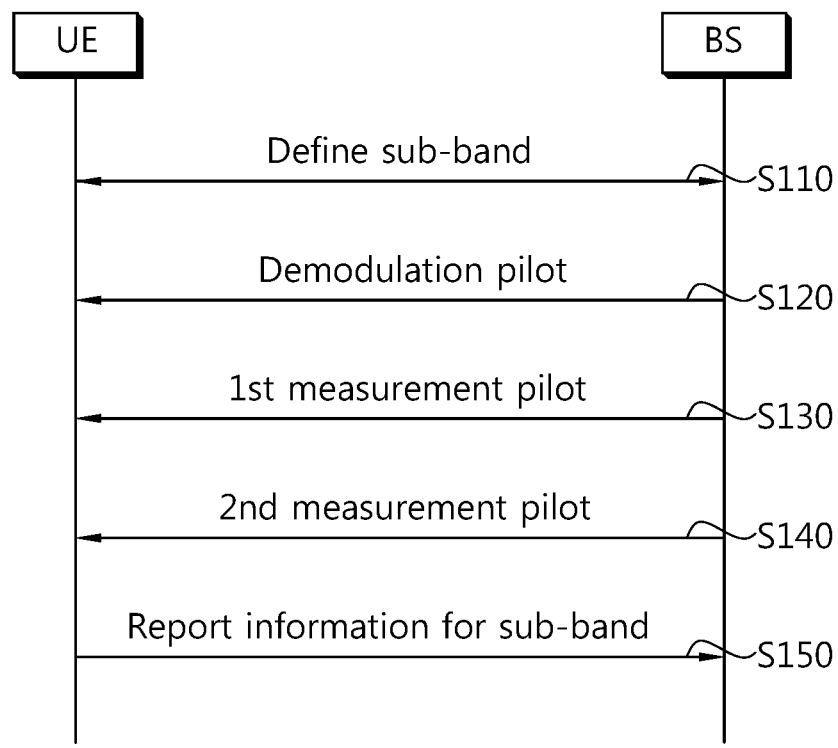
FIG. 6 shows a method of transmitting a pilot on a sub-band basis according to an embodiment of the present invention.

FIG. 6 shows a method of transmitting a pilot on a sub-band basis according to an embodiment of the present invention.

Referring to FIG. 6, the sub-band is defined between a BS and a UE (step S110). The sub-band may be defined to include at least one PRU or at least PRB in the frequency band. That is, the number of PRUs or PRBs included in the sub-band may be defined. Alternatively, the number of frequency-domain subcarriers included in the sub-band or the number of sub-bands included in a full frequency band may be defined. The definition on the sub-band may be pre-agreed between the BS and the UE, or may be indicated through control signaling from the BS.

A predefined precoding matrix or vector may be used for parts of all sub-bands, and a non-predefined precoding matrix or vector may be used for the remaining sub-bands. The sub-band which uses the predefined precoding matrix or vector is called a static precoding sub-band (hereinafter, an SP sub-band). The precoding matrix or vector applied to the SP sub-band may change semi-statically, and this may be indicated through DL control signaling transmitted from the BS. The sub-band which uses the non-predefined precoding matrix or vector is called a dynamic precoding sub-band (hereinafter, a DP sub-band). The precoding matrix or vector applied to the DP sub-band may change dynamically according to the request of the UE or the determination of the BS.

A unit for transmitting data or a pilot in a time domain is defined as a transmission section. The transmission section may correspond to a subframe, a frame, a TTI, or a slot. A plurality of sub-bands may be included in one transmission section. The SP sub-band and the DP sub-band may be included in the transmission section. Arrangement of the SP and DP sub-bands included in the transmission section may change semi-statically. The arrangement of the SP and DP sub-bands included in the transmission section may be indicated through DL control signaling transmitted from the BS.

The BS transmits a demodulation pilot to the UE (step S120). The demodulation pilot is a pilot used for channel estimation for demodulation of a received signal. The demodulation pilot may also be called a dedicated pilot, a user-specific pilot, etc. The same precoding matrix or vector may be applied to the demodulation pilot and data. Each sub-band may have its demodulation pilot allocated to the sub-band itself. That is, the UE may receive the demodulation pilot of each sub-band to demodulate data transmitted through the corresponding sub-band.

The BS transmits a $1^{st}$ measurement pilot to the UE (step S130). The BS transmits a $2^{nd}$ measurement pilot to the UE (step S140). The $1^{st}$ measurement pilot may be transmitted through a $1^{st}$ transmission section, and the $2^{nd}$ measurement plot may be transmitted through a $2^{nd}$ transmission section which is subsequent in time to the $1^{st}$ transmission section.

The measurement pilot may a pilot for channel measurement. The measurement pilot is a pilot used to obtain channel information such as channel state information (CSI), a precoding matrix indicator (PMI), a channel quality indicator (CQI), a rank, a best band, etc. The measurement pilot may also be called a midamble, a common pilot, a cell-specific pilot, etc.

The measurement pilot may be allocated only to the DP sub-band which uses the non-predetermined precoding matrix or vector, and such a pilot is called a DP measurement pilot. The measurement pilot may be allocated to a whole sub-band, and this is called a whole band (WB) measurement pilot. Any one of the $1^{st}$ measurement pilot and the $2^{nd}$ measurement pilot may be the DP measurement pilot, and the other pilot may be the WB measurement pilot. That is, the DP measurement pilot is carried on a DP subframe of the $1^{st}$ transmission section or the $2^{nd}$ transmission section, and the WB measurement pilot is carried on the whole sub-band which is a transmission section different from the transmission section in which the DP measurement pilot is carried.

The WB measurement pilot may be additionally used together with the DP measurement pilot. That is, the WB measurement pilot may optionally be not used, and only the DP measurement pilot may be used. The DP measurement pilot may be periodically arranged in a unit of transmission section. The WB measurement pilot may be periodically arranged in the unit of transmission section. Locations of the DP measurement pilot and the WB measurement pilot may be indicated through DL control signaling.

The DP measurement pilot and the WB measurement pilot may be transmitted with different periods. The DP measurement pilot and the WB measurement pilot may be transmitted through different transmission sections. The DP measurement pilot may be transmitted with a shorter period than the WB measurement pilot. The period or arrangement of the measurement pilot may be determined according to a frequency partition of fractional frequency reuse (FFR). For example, if an SP sub-band and a DP sub-band have different configurations between cells or between sectors and the configurations of the SP sub-band and the DP sub-band in a cell or sector are not reported to a UE of a neighboring cell or sector, the UE of the neighboring cell or sector has to obtain a PMI by using the WB measurement pilot.

The demodulation pilot may not be allocated to the sub-band of the transmission section in which the WB measurement pilot is transmitted. That is, the demodulation pilot may be allocated only to the sub-band of the transmission section in which the WB measurement pilot is not transmitted. The WB measurement pilot may take a role of the demodulation pilot. The UE may perform channel estimation for data demodulation by using the WB measurement pilot. When data is transmitted with a maximum rank (e.g., when data is transmitted with a rank 4 at 4Tx transmission), a channel for data modulation may be estimated by using the WB measurement pilot. If the data is transmitted with a lower rank than the maximum rank, a specific number of DP measurement pilots may be arranged, where the specific number corresponds to a difference between the lower rank and the maximum rank.

The UE reports information for the sub-band to the BS (step S150). The information for the sub-band implies channel information for a plurality of sub-bands. Regarding the SP sub-band, the UE may obtain and report a rank index (RI), a CQI, and/or a stream index on the basis of the demodulation pilot. Regarding the DP sub-band, the UE may obtain and report an RI, a best band index, a CSI (or PMI), and/or a CQI on the basis of the measurement pilot. The demodulation pilot may be used when the UE reports the CQI of the DP sub-band.

Figure 7:
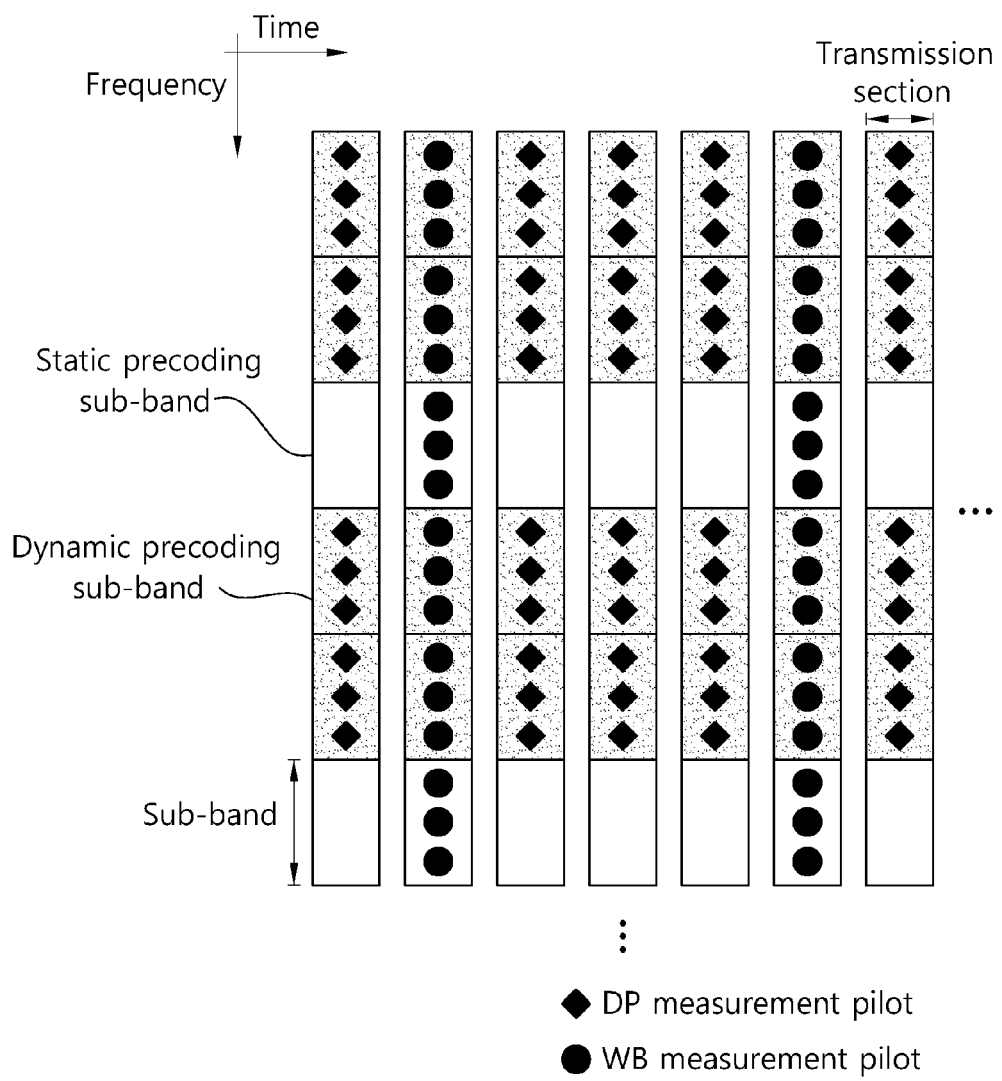
FIG. 7 shows pilots arranged on a sub-band basis according to an embodiment of the present invention.

FIG. 7 shows pilots arranged on a sub-band basis according to an embodiment of the present invention.

Referring to FIG. 7, in a wireless communication system, a radio resource includes a plurality of sub-bands in a frequency domain and includes a plurality of transmission sections in a time domain. Parts of the plurality of sub-bands may be SP sub-bands which use a predefined precoding matrix or vector, and the remaining sub-bands may be DP sub-bands which use a non-predefined precoding matrix or vector. The SP sub-band and the DP sub-band may be allocated in the frequency domain in a localized manner. Alternatively, the SP sub-band and the DP sub-band may be allocated in the frequency domain in a distributed manner. Arrangement of the SP sub-band and the DP sub-band in the frequency domain may be predetermined or may be indicated through control signaling from a BS. The transmission section may include a plurality of OFDM symbols. The transmission section may correspond to a slot, subframe, frame, TTI, or the like which includes a plurality of OFDM symbols.

Among the plurality of transmission sections, the DP measurement pilot may be allocated to a transmission section other than a transmission section to which the WB measurement pilot is allocated. The WB measurement pilot may be allocated to a transmission section with a specific interval. Herein, it is shown that the WB measurement pilot is allocated with an interval of 4 transmission sections. In the time domain, the WB measurement pilot may optionally be allocated with a long period or a short period. In the time domain, an interval or period according to which the WB measurement pilot and the DP measurement pilot are allocated is not limited. The DP measurement pilot may be arranged only in the DP sub-band. The WB measurement pilot may be arranged in a whole sub-band. The DP measurement pilot may be mapped to one OFDM symbol, or may be mapped across a plurality of OFDM symbols in a transmission section (e.g., a subframe or TTI) in a distributed manner. The WB measurement pilot may be mapped to one OFDM symbol, or may be mapped across a plurality of OFDM symbols in a transmission section in a distributed manner. In the transmission section, arrangement of the DP measurement pilot and the WB measurement pilot is not limited.

Figure 8:
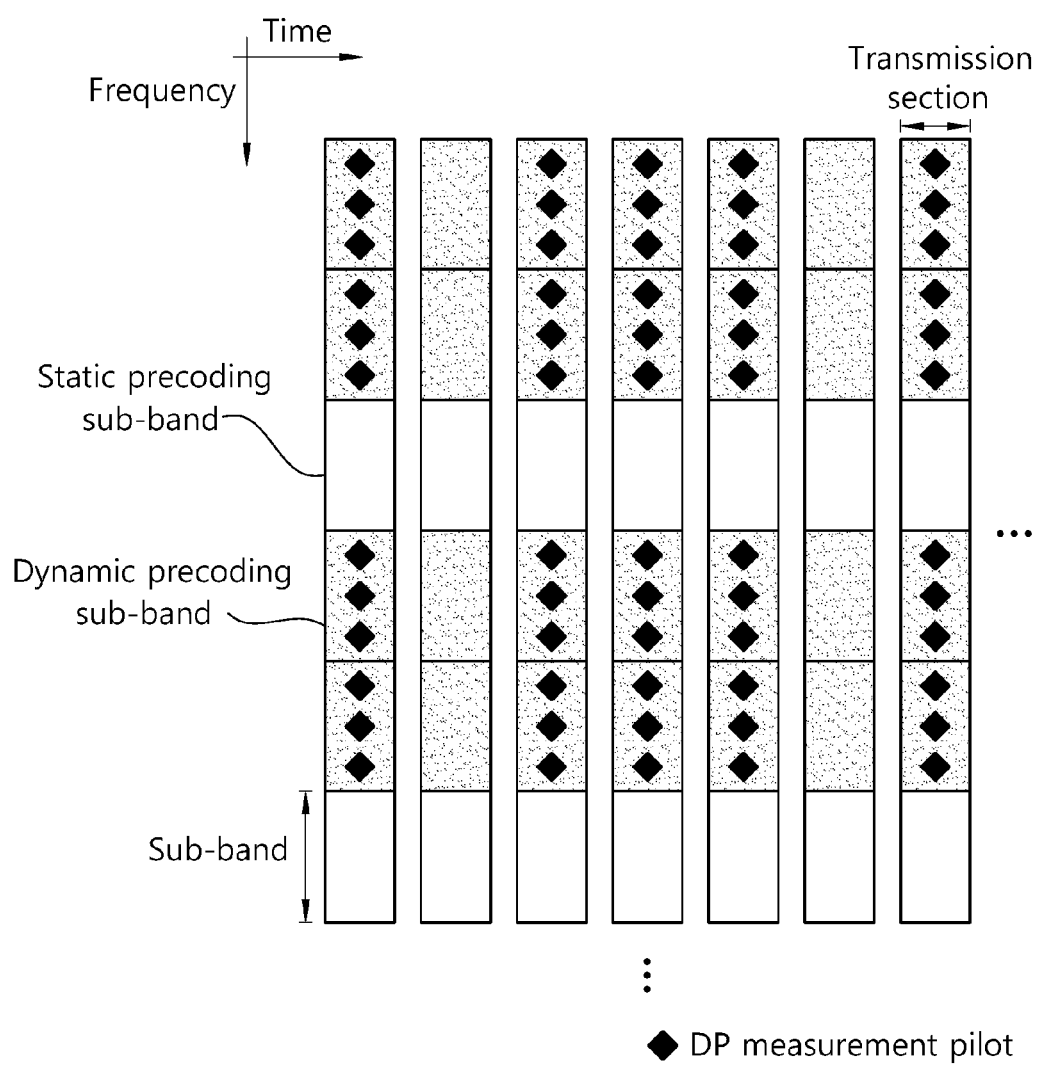
FIG. 8 shows pilots arranged on a sub-band basis according to another embodiment of the present invention.

FIG. 8 shows pilots arranged on a sub-band basis according to another embodiment of the present invention.

Referring to FIG. 8, a WB measurement pilot is not allocated unlike in FIG. 7. For example, the WB measurement pilot may be punctured in transmission in the pilot arrangement of FIG. 7. At a location where the WB measurement pilot is punctured, a demodulation pilot or user data may be mapped in transmission. Alternatively, a DP measurement pilot may be allocated to a transmission section in which the WB measurement pilot is punctured. Whether to allocate the WB measurement pilot may be pre-agreed or may be indicated through control signaling from a BS.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A pilot transmission method in a wireless communication system, comprising:
   transmitting a first pilot for channel measurement through a first transmission section;
   transmitting a second pilot for the channel measurement through a second transmission section which is subsequent in time to the first transmission section,
   wherein the first transmission section and the second transmission section include a plurality of sub-bands,
   wherein a first portion of the plurality of sub-bands uses predetermined precoding and a second portion of the plurality of sub-bands uses non-predetermined precoding,
   wherein the transmission of the first pilot is carried on the second portion of the plurality of sub-bands, and
   wherein the transmission of the second pilot is carried on both first and second portions of the plurality of sub-bands, and
   receiving channel information on the plurality of sub-bands,
   wherein the channel information is at least one of a rank index (RI), a precoding matrix indicator (PMI), a channel quality indicator (CQI), and channel state information (CSI).

2. The pilot transmission method of claim 1, wherein modification of a vector or a precoding matrix applied to the first portion of the plurality of sub-bands is instructed by a base station.

3. The pilot transmission method of claim 1, wherein a vector or a precoding matrix applied to the second portion of the plurality of sub-bands is modified according to the determination of a base station or the request of a user equipment.

4. The pilot transmission method of claim 1, wherein the first pilot is a DP measurement pilot, and the second pilot is a WB measurement pilot.

5. The pilot transmission method of claim 1 wherein the first portion of the plurality of sub-bands is comprised with static precoding sub-bands, and the second portion of the plurality of sub-bands is comprised with dynamic precoding sub-bands.

6. The pilot transmission method of claim 1, wherein the first transmission section and the second transmission section are slots or subframes which include a plurality of OFDM symbols.

7. The pilot transmission method of claim 1, wherein the first transmission section and the second transmission section are frames which include at least one subframe including a plurality of OFDM symbols.

8. A method of receiving a pilot in a wireless communication system, the method comprising:
   receiving a first pilot for channel measurement through a first transmission section:
   receiving a second pilot for channel the channel measurement through a second transmission section which is subsequent in time to the first transmission section,
   wherein the first transmission section and the second transmission section include a plurality of sub-bands,
   wherein the first portion of the plurality of sub-bands uses predetermined precoding and a second portion of the plurality of sub-bands uses non-predetermined precoding,
   wherein the reception of the first pilot is carried on the second portion of the plurality of sub-bands, and
   wherein the reception of the second pilot is carried on both first and second portions of the plurality of sub-bands, and
   transmitting channel information on the plurality of sub-bands,
   wherein the channel information is at least one of a rank index (RI), a precoding matrix indicator (PMI), a channel quality indicator (CQI), and channel state information (CSI).

9. The method of claim 8, wherein modification of a vector or a precoding matrix applied to the first portion of the plurality of sub-bands is instructed by a base station.

10. The method of claim 8, wherein a vector or a precoding matrix applied to the second portion of the plurality of sub-bands is modified according to the determination of a base station or the request of a user equipment.

11. The method of claim 8, wherein the first pilot is a DP measurement pilot, and the second pilot is a WB measurement pilot.

12. The method of claim 8, wherein the first portion of the plurality of sub-bands is comprised with static precoding sub-bands, and the second portion of the plurality of sub-bands is comprised with dynamic precoding sub-bands.

13. The method of claim 8, wherein the first transmission section and the second transmission section are slots or subframes which include a plurality of OFDM symbols.

14. The method of claim 8, wherein the first transmission section and the second transmission section are frames which include at least one subframe including a plurality of OFDM symbols.

* * * * *